United States Patent [19]

Wilson

[11] 4,219,044
[45] Aug. 26, 1980

[54] CONTROL VALVE ASSEMBLY

[76] Inventor: Warren M. Wilson, 809 Superior Dr., Huron, Ohio 44839

[21] Appl. No.: 951,073

[22] Filed: Oct. 13, 1978

[51] Int. Cl.³ .............................................. F16K 49/00
[52] U.S. Cl. ..................................... 137/340; 137/334
[58] Field of Search ............... 137/340, 334, 335, 341, 137/110, 630.19; 4/145

[56] References Cited

U.S. PATENT DOCUMENTS

| | | | |
|---|---|---|---|
| 2,309,296 | 1/1943 | Bentley | 137/340 X |
| 2,392,213 | 1/1946 | Cruzan | 137/340 X |
| 2,829,669 | 4/1958 | Luzynski | 137/334 X |
| 3,100,001 | 8/1963 | Forwald | 137/630.19 X |
| 3,184,295 | 5/1965 | Baverstock | 137/340 X |
| 3,610,279 | 10/1971 | McIntosh et al. | 137/334 X |
| 3,640,331 | 2/1972 | Yagishita | 137/340 X |

*Primary Examiner*—Albert J. Makay
*Assistant Examiner*—William E. Tapolcai, Jr.

[57] ABSTRACT

A control valve assembly 10 for use in a system for heating water is disclosed. The system includes a source of steam 12, a steam condensate trap, a source of cold water, a heat exchanger 14 to transfer heat from the steam to the cold water, and an outlet where heated water is used. The control valve 10 assembly includes a dual valve structure which splits the flow of incoming cold water, directing one portion of it to the heat exchanger 14 and bypassing the other portion of the incoming cold water around the heat exchanger. The two portions of the incoming water rejoin in a blending chamber 16 which is connected with a water line to supply blended hot water to an outlet such as a shower or faucet. A controller 36 within the control valve assembly 10 is responsive to the demand for blended hot water. The controller regulates valves 18 and 22 which control the flow of water through the heat exchanger 14 and the flow of water bypassed around the heat exchanger to maintain the temperature of the water leaving the blending chamber 16 constant despite variations in the flow rate of blended hot water through the outlet 20.

26 Claims, 9 Drawing Figures

CONTROL VALVE ASSEMBLY

BACKGROUND OF THE INVENTION

The present invention relates to an assembly for mixing or blending cold water with overheated hot water to form a stream of hot water at a desired temperature. In particular the present invention relates to a control valve assembly which is capable of maintaining a stream of blended hot water at a nearly constant temperature over a wide range of flow rates of blended hot water.

In hot water heating systems, particularly in institutional systems, it may be practical to heat water with a supply of steam. In such a system cold water is passed through one set of passages in a heat exchanger and is heated by the steam which passes through an adjoining set of passages. The output from the heat exchanger is overheated, that is, it is much too hot to be safe for use at a hot water tap. This overheated water is blended with cold water in the water heater until the resultant mixture is at a suitable temperature for the hot water tap.

There have been previous attempts to provide a controller which is capable of maintaining the temperature of the blended water constant over a wide range of flow rates. Some of these have used sleeve valves. Problems have been encountered when using sleeve valves to regulate water flow because the machined surfaces of those valves tend to corrode and to accumulate deposits making them difficult to operate. In addition, the constant contact between the sliding and fixed members of a sleeve valve creates friction which must be overcome to change the valve position. Some patents disclosing the use of sleeve valves in blending hot water heaters are U.S. Pat. Nos. 3,670,807, 3,388,861, and 3,232,336.

Further problems have been encountered when a flow of heated water is regulated by passing the hot water through a variable orifice. This can be explained by the principle that heated water passing through an orifice of the proper size will regulate its own flow. The size of the orifice establishes a reference temperature. If the temperature of the heated water exceeds the reference temperature, the flow through the orifice is choked off by cavitation or flashing downstream of the orifice. Choking continues until the temperature drops down to the reference temperature.

This choking phenomenon can be dangerous, since the result of choking off the flow is a rise in the pressure upstream of the valve or orifice. If the heat exchanger is upstream of the flow regulating valve, the pressure rise may cause the heat exchanger to explode. Blending hot water heaters having valves to regulate the flow of hot water downstream of the heat exchanger are disclosed in each of the above mentioned patents and in U.S. Pat. No. 2,610,837.

Difficulties have been encountered in producing a blending hot water heater which can maintain the temperature of blended water constant over a wide range of demand. To maintain the water leaving the blending chamber at a constant temperature the ratio between the superheated water arriving in the blending chamber and the cold water arriving in the blending chamber must be varied to compensate for two factors. First the pressure drop associated with the heat exchanger changes with the rate of flow through the heat exchanger. Second, the superheated water temperature tends to fall with increasing flow through the heat exchanger. Consequently, any controller which is to keep the blended water temperature constant must be able to compensate for the changes in these two factors with changing flow rates.

Further, many known control valve assemblies for blending hot water heaters have cumbersome external lines for conducting pressure to diaphragm controllers. These lines are not only difficult to install, they are prone to damage in service because they are generally made of a thin wall tubing and are in vulnerable locations.

SUMMARY OF THE INVENTION

The present invention provides a new and improved control valve assembly for use in a blending hot water heater. The flow of cold water into the valve assembly is split, a portion of it flowing through an inlet valve into a heat exchanger, and a portion of it flowing through a bypass valve into a blending or mixing chamber. Overheated water from the heat exchanger flows into the blending or mixing chamber. The relative flow rates of cold water and overheated water into the blending or mixing chamber are regulated by diaphragm actuated inlet and bypass valves.

Both the inlet and bypass valves are poppet-type valves which inherently require little maintenance. Because no tight fitting machined surfaces slide on one another, there is little tendency for corrosion to be a problem. Further, the overheated water from the exchanger never flows through a flow regulating orifice, and consequently the dangerous tendency for the flow of hot water to choke itself off and raise the heat exchanger pressure is not present.

The ratio of the flow of water bypassed around the heat exchanger to the flow through the heat exchanger is controlled by a controller including a diaphragm which actuates a valve stem. A pressure drop caused by an increase in demand is sensed by the diaphragm. The valve stem moves an amount which corresponds to the size of the demand increase and opens one of the poppet valves a like amount. The other poppet valve also opens when the valve stem moves, but the extent of opening is adjusted to compensate for changes in the pressure drop across the heat exchanger and for changes in the superheated water temperature, both caused by the changing flow rate.

Two adjustments are provided to assure that the blended water temperature is very nearly constant over a wide range of demand. A first or low-flow temperature adjustment is made when the demand for blended hot water is small. The amount of cold water admitted through the bypass valve into the blending or mixing chamber is adjusted by moving a bypass valve seat toward or away from the bypass valve member until the desired blended hot water temperature is achieved.

The second adjustment is made when the flow is about 50% of capacity. In one preferred embodiment a pair of opposing springs supports the bypass valve member for sliding movement on the valve stem. The compressive force in the springs is changed to cause the valve member to move toward or away from the bypass valve seat and thus to regulate the amount of cold water admitted to the blending chamber at 50% flow.

In a second preferred embodiment, an inlet valve seat floats between two opposed springs. The second adjustment in this embodiment regulates the amount of cold water admitted to the heat exchanger at about 50% of maximum flow. The low-flow adjustment is the same in both preferred embodiments.

In addition, either embodiment of the present invention may include a steam control valve operatively connected with the controller to regulate the flow of steam through the heat exchanger. The steam control valve includes a variable orifice which is manually adjustable to select the maximum flow rate of steam through the heat exchanger. The steam control valve also includes poppet valves which vary the flow of steam in response to variations in demand between no flow at no demand conditions and the maximum flow established by the manually adjustable orifice at maximum demand conditions.

Accordingly, it is an object of the present invention to provide a new and improved control valve assembly for use in a blending hot water heater in which an incoming stream of cold water is split, one portion following a path through a heat exchanger and into a mixing chamber, the other portion flowing directly into the mixing chamber.

It is a further object of the present invention to provide a new and improved control valve assembly for use in a blending hot water heater which is capable of controlling the proportion of hot and cold water entering a mixing chamber by using poppet valves.

It is a further object of the present invention to provide a new and improved control valve assembly for use in a blending hot water heater wherein there is no variable orifice valve interposed in the flow of hot water to the blending chamber to regulate the flow thereof.

It is a further object of the present invention to provide a new and improved control valve assembly for use in a blending hot water heater having a controller which is capable of maintaining the temperature of the blended water leaving the control valve assembly at a nearly constant temperature over a wide range of demand.

It is a further object of the present invention to provide a new and improved control valve assembly for use in a blending hot water heater which is free of external pressure sensing lines and in which all pressure conducting passages are internal to the control valve assembly.

It is a further object of the present invention to provide a new and improved control valve assembly for use in a blending hot water heater in which the ratio of cold water entering a mixing chamber to the hot water entering the mixing chamber is maintained properly despite variations in the demand for mixed hot and cold water in order to keep the mixed water temperature nearly constant over a wide range of demand.

It is a further object of the present invention to provide a new and improved control valve assembly for use in a blending hot water heater in which the control valve assembly is adjustable to select the mixed hot and cold water output temperature at a low rate of flow and to select the mixed water output temperature at a high rate of flow.

It is a further object of the present invention to provide a new and improved control valve assembly for use in a blending hot water heater in which the control valve assembly includes a steam regulating valve to regulate the flow of steam through a heat exchanger in response to variations in demand for blended hot water between a minimum flow at no demand conditions and a manually adjustable maximum at maximum demand conditions.

BRIEF DESCRIPTION OF THE DRAWINGS

These and other objects and features of the present invention will become apparent from the following specification describing preferred embodiments shown in the accompanying drawings.

DESCRIPTION OF A PREFERRED EMBODIMENT

Figure 1:
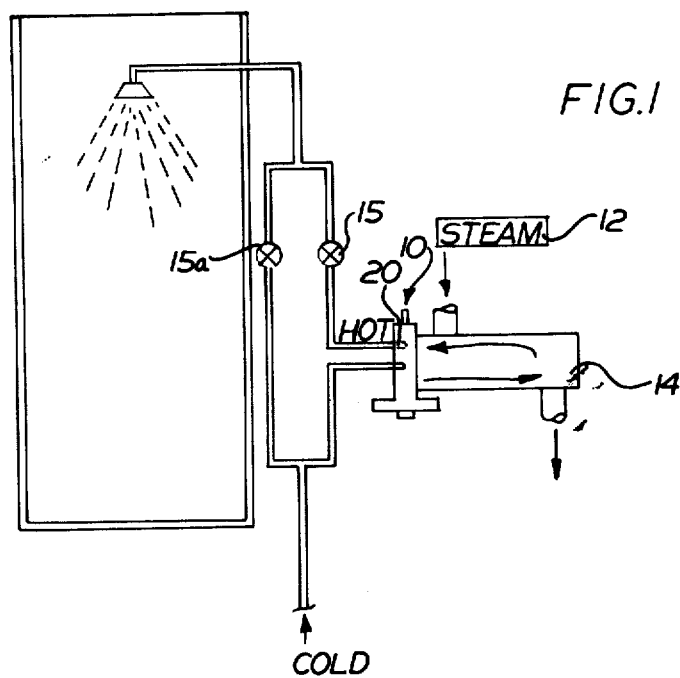
FIG. 1 is a schematic view of a hot water system showing a shower and a blending hot water heater having a heat exchanger and a control valve assembly constructed according to the present invention.

A control valve assembly 10 constructed in accordance with the present invention is adapted to supply blended hot water at a constant temperature over a wide variation in the amount of blended hot water demanded (FIG. 1). It is particularly adapted for heating water for use in locker rooms or change houses associated with athletic facilities or anywhere the demand for hot water may vary widely from time to time. A continuously flowing low pressure steam supply 12 heats cold water passing through a conventional heat exchanger 14. The temperature of the water supplied to a hot water tap 15 is regulated by the control valve assembly 10 which mixes a controlled amount of cold water with overheated hot water leaving the heater exchanger 14. The user may regulate the final temperature to preference by opening or closing cold water valve 15a.

To create a demand for blended hot water a tap 15 is opened. In response to this demand cold water is supplied by the control valve assembly 10 to the heat exchanger 14. Cold water entering the heat exchanger 14 is heated to a temperature greater than the temperature desired at the hot water tap 15. Upon leaving the heat exchanger 14, the overheated hot water enters a mixing chamber 16 (FIG. 2) where cold water is mixed with the overheated water to form a mixture at the temperature desired at the hot water tap 15.

As the demand for hot water increases, the pressure drop between the inlet 23 and the outlet 24 of the heat exchanger 14 also increases. The water leaving the heat exchanger 14 under high demand conditions is at a lower pressure than it is when the demand for hot water is low. Under high demand and high flow rate conditions, viscous friction forces oppose the flow of water through the heat exchanger 14. These friction forces increase with increasing water flow rate. To maintain the hot water temperature at tap 15 constant the bypass valve 22 regulates the cold water flow into the blending chamber 16. The bypass valve 22 does not open as rapidly in response to an increase in demand as the inlet valve 18 which regulates the flow of water to the heat exchanger 14. This compensates for the decrease in pressure of the overheated water leaving the heat exchanger 14 under high demand conditions.

Minerals, which are found in all water supplies and which may make the water hard, may break down and precipitate out of the water when the water temperature exceeds about 120° F. This phenomenon can cause problems for valves which regulate the flow of hot water. The inlet valve 18 regulates the flow of cold water into the heat exchanger 14 but does not come in contact with the flow of overheated hot water out of the heat exchanger. The inlet valve 18 is located upstream of the inlet 23 to the heat exchanger 14, and it encounters only cold water. Thus, the inlet valve 18 has little tendency to accumulate mineral deposits, and it requires less frequent maintenance than blending valves which come in contact with heated water.

Another problem with valves which regulate the flow of hot water is that hot water passing through an orifice tends to regulate its own flow. If hot water from a heat exchanger encounters a restriction of the proper size, the flow may be choked off causing the pressure in the heat exchanger to rise.

The size of the restriction in a flow of hot water determines a reference temperature. If the water is above the reference temperature, the flow through the restriction will choke itself off until the temperature drops. The choking of a flow of hot water through a restriction is caused by flashing or cavitation just downstream of the restriction. The flashing and resulting expansion of the flowing fluid tends to block off flow through the restriction. This later effect can be dangerous since it may result in increased pressure in an upstream heat exchanger, and may cause the heat exchanger to burst.

According to the present invention, overheated water leaving the heat exchanger 14 enters the mixing chamber 16 by flowing along a path that is free of restrictions which could choke the flow. The overheated water is met by a flow of cold water which has bypassed the heat exchanger 14. The overheated water and the cold water blend and form a mixture of water at the desired temperature before leaving the control valve assembly 10.

The bypass valve 22 regulates the flow rate of cold water which is mixed with the overheated water in the mixing chamber 16 and thus the final temperature of the water leaving the control valve assembly 10. Utilizing the bypass valve 22 to regulate the final temperature of the water at the tap 15 has two important beneficial effects. First it assures that hot water does not encounter a valve. This construction prevents the dangerous build up of pressure upstream of a valve or restriction when the hot water passing through the valve regulates its own flow. Second, the bypass valve 22 regulates only cold water, and thus does not accumulate mineral deposits as rapidly as a hot water valve would.

Figure 2:
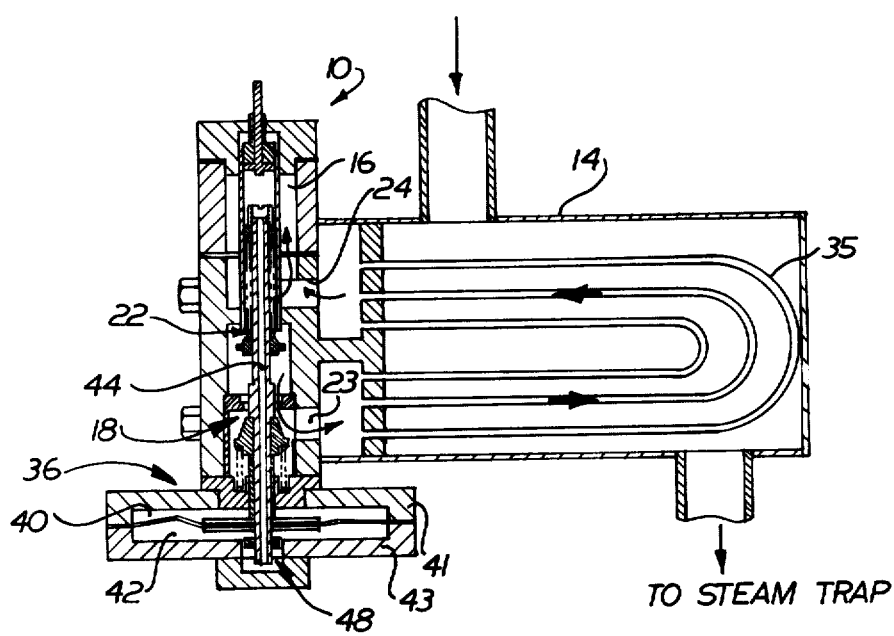
FIG. 2 is a side sectional view of the heat exchanger and control valve assembly of FIG. 1 showing an inlet valve and a bypass valve.

The inlet valve 18 controls the flow of cold water to the heat exchanger 14. There is a pressure drop across the heat exchanger 14 caused by the frictional forces opposing motion of the water through the tubes 35 in the exchanger (FIG. 2). This causes the pressure of the overheated water entering the mixing chamber 16 to be less than the pressure of the cold water entering the mixing chamber 14 through bypass valve 22. Since water will not flow from low pressure to high pressure, pressure losses in the heat exchanger assure that no hot water will flow through the bypass valve 22.

The pressure drop across the heat exchanger 14 is a function of the flow rate through it. Increasing the opening of valve 18 a small amount when the flow rate is large produces a smaller change in the flow through the heat exchanger than making the same size increase in the opening of valve 18 when the flow rate is small. A controller 36 compensates for the changing pressure drop across the heat exchanger 14 to maintain the proper ratio between the overheated water and the cold water entering the mixing chamber 16. This assures that the blended water temperature will be constant over a wide range of demand.

It is within the scope of the present invention to construct a control valve assembly using sleeve valves. However, one preferred embodiment utilizes poppet valves 18 and 22. Poppet valves as a class require smaller forces to operate them since they have less internal friction than do sleeve valves. Further, poppet valves tend to be self-cleaning and to resist the accumulation of mineral deposits.

Figure 3:
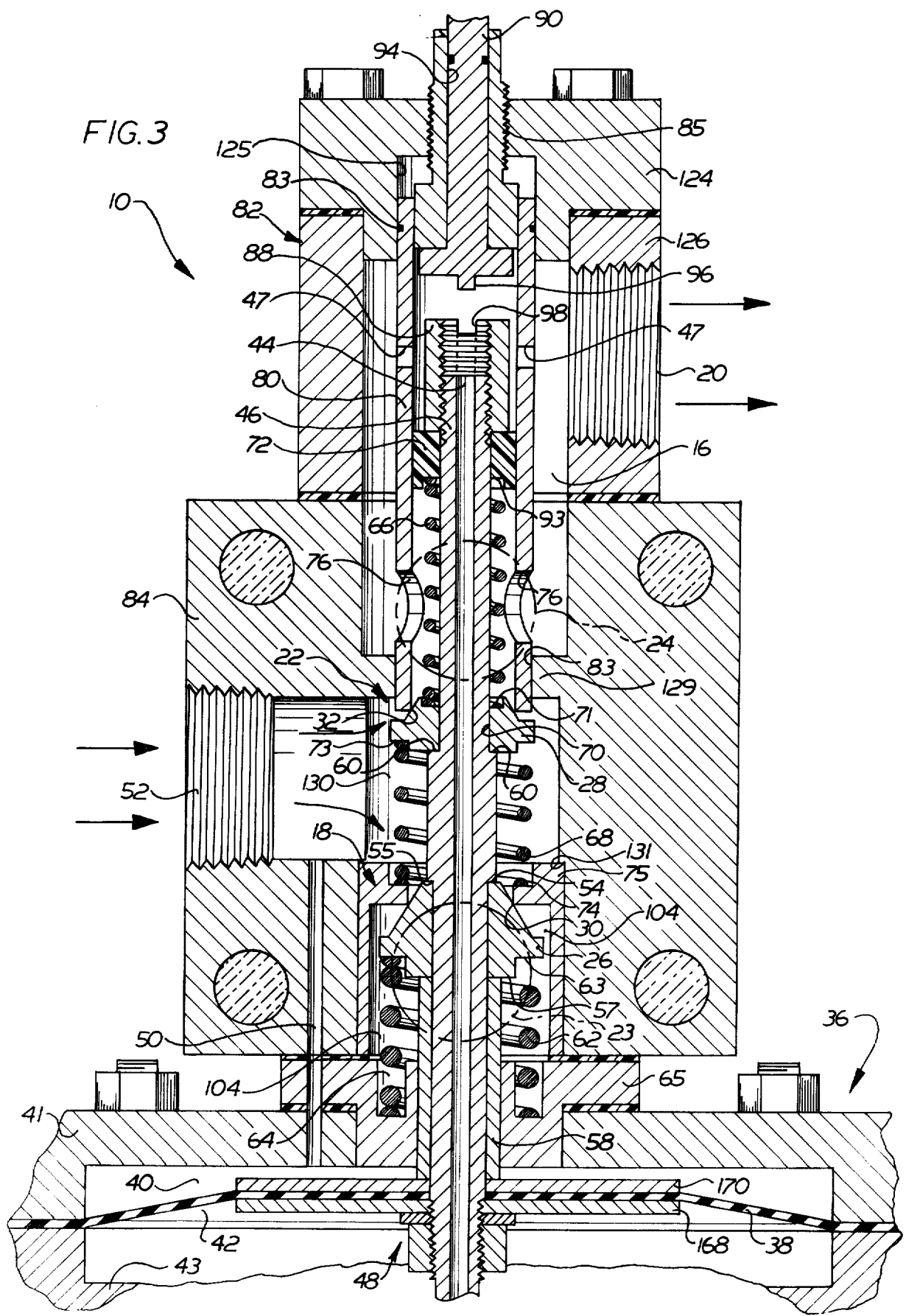
FIG. 3 is an enlarged front sectional view of the control valve assembly shown in FIG. 1.

Both the inlet 18 and bypass 22 valves include frustroconical poppets or valve members 26 and 28 and cooperating circular valve seats 30 and 32 (FIG. 3). In a preferred embodiment the two valve seats 30 and 32 are approximately the same diameter. When the flow rate through valves 18 and 22 is the same, the pressure drop across each is also the same.

The valve controller 36 actuates the valves 18 and 22 in response to variations in the demand for blended hot water. The controller 36 includes a diaphragm 38 which forms a movable barrier between an upper chamber 40 formed in the upper controller body member 41 and a lower chamber 42 formed in the lower controller body member 43. The upper 41 and lower 43 controller body members are generally cylindrical and have opposed coaxial cylindrical recesses which form the upper pressure chamber 40 and the lower pressure chamber 42.

Pressure from the blended water outlet 20 reaches the lower chamber 42 through cylindrical passages 47 and a central passage 44 in the stem 46. The stem 46 extends through and is fixedly connected with the diaphragm 38 by suitable means such as diaphragm retainer 48.

The pressure acting on the top side of the diaphragm 38 is supplied through a passage 50. The passage 50 connects the cold water inlet 52 with the upper pressure chamber. Upon initiation of demand for blended hot water, the pressure at the blended water outlet 20 drops. This pressure drop is communicated through the central cylindrical passage 44 in the stem 46 to the lower diaphragm chamber 42. The pressure differential across the diaphragm 38 causes the diaphragm to move downward, which moves the stem 46 downward and actuates the valves 18 and 22.

The inlet valve member 26 is fixedly connected with the stem 46. The smaller diameter upper end 54 of the inlet valve member 26 abuts an annular surface 55 projecting radially outward from the stem 46. A portion of the lower larger diameter end surface 57 of the inlet valve member 26 abuts a spacer cylinder 58 which is coaxial with the stem 46. The lower end of spacer cylinder 58 abuts the diaphragm retainer 48. Thus the inlet valve member 26 is held in a fixed axial position on the stem 46, and when the stem 46 moves downward, the inlet valve 18 is opened an equal amount.

A range spring 62 biases the stem 46 and the inlet valve member 26 upward toward the closed position shown in FIG. 3. The range spring 62 presses between a lower annular end surface 63 of the inlet valve member 26 and the bottom of an annular recess 64 in the lower stem guide 65. The annular recess 64 in the lower stem guide 65 is provided to keep the range spring 62 centered around the axis of the stem 46 and to prevent binding.

The motion of the bypass valve member 28 is also controlled by the motion of the stem 46. When the stem 46 is in its uppermost position corresponding to a zero demand for blended hot water as shown in FIG. 3 and during the initial portion of the downward stroke of the stem, the radially projecting annular shoulder 60 contacts the bottom 73 of the bypass valve member 28 and urges it upward against the net force of the compression spring 66 and the yield spring 68. When the bypass valve 18 is open, cold water from the cold water inlet 52 enters the mixing chamber 16 after passing through the bypass valve seat 32 and passages 76 in the tubular member 80.

As previously noted, as the demand for blended hot water increases, the controller 36 moves the stem 46 downward. Once the stem 46 has moved beyond the position corresponding to between 10% and 25% of maximum flow, the shoulder 60 on the stem is no longer in contact with the bypass valve member 28. The position of the bypass valve member 28 is then controlled only by the compression spring 66 and the yield spring 68.

The exact flow rate at which the bypass valve member 28 lifts from the shoulder 60 depends on the blended hot water temperature selected. If the selected temperature is high, i.e. 200° F., the bypass valve 22 will open a relatively small fraction compared to the inlet valve 18, and the bypass valve member 28 will lift off the shoulder 60 at about 10% of maximum flow. On the other hand, if the selected temperature is relatively low, i.e. 100° F., the bypass valve 22 will open a relatively large fraction compared to the inlet valve 18. In this case the bypass valve member 28 will lift off the shoulder 60 at about 25% of maximum flow.

At some flow rate greater than between 10% and 25% of maximum flow the bypass valve member 28 floats axially on the valve stem 46 between two helical springs, an upper compression spring 66 and a lower yield spring 68. The compressive force in the springs 66 and 68 is controlled by the position of the stem. The valve member 28 has a central cylindrical passage 70 in sliding abutting engagement with the outside surface of the stem 46. This assures that the compressive force in each spring will be the same. Any imbalance of force will cause the valve member 28 to slide on the stem 46 until the forces applied by the springs 66 and 68 to opposite sides of the valve member are balanced again. The compression spring 66 extends between the top side 71 of the bypass valve member 28 and an annular stem guide 72 connected with the stem 46. The yield spring 68 extends between the bottom 73 of the bypass valve member 28 and an annular recess 74 in the inlet valve seat member 75. As the stem guide 72 moves up or down, the compressive force in the springs 66 and 68 changes. The spring rate or stiffness of the compression and yield springs 66 and 68 may be selected so that the ratio of the flow of cold water through the bypass valve 22 into the mixing chamber 16 to the flow of overheated hot water from the heat exchanger 14 into the mixing chamber remains constant despite variations in the flow rate of blended water. Maintaining the ratio of these flow rates constant serves to keep the blended water temperature uniform over the entire range of flow rates.

The flow rate of cold water into the mixing chamber 16 depends only on the position of valve 22. The flow rate of overheated water from the heat exchanger 14 into the mixing chamber 16 depends on the position of valve 18 and on a heat exchanger friction factor which varies with the flow rate. In addition the temperature of the overheated water entering the blending chamber 16 tends to fall with increasing flow rates through the heat exchanger 14. Consequently the controller 36 must open the valves 18 and 22 to an extent which compensates for the changing friction factor and the changing temperature of the overheated water if the temperature of the blended water is to remain constant over a range of flow rates.

The friction factor increases with increasing flow rates to reflect an increase in the viscous resistence to flow with increasing flow rates through the heat exchanger 14. In addition as the flow rate through the heat exchanger 14 increases, the temperature of the water leaving the heat exchanger decreases. Together these two factors tend to cause a decrease in the blended hot water temperature with increasing flow. In order to compensate for the increase in resistance to flow through the heat exchanger 14 and the falling overheated water temperature as the flow rate increases, at flow rates above about 25% of the maximum flow rate the bypass valve 22 is opened less than the inlet valve 18.

When the stem 46 moves from a closed position to an open position in response to a demand for blended hot water which is less than 25% of the maximum demand, the downward force exerted by the compression spring 66 exceeds the upward force of the yield spring 68 with the result that the bypass valve member 28 remains seated against the shoulder 60 of the stem 46 during the first quarter of its downward stroke. When the stem 46 reaches a position corresponding to about 25% of maximum flow, the upward force of the yield spring 68 balances the force of the compression spring 66. Further downward motion of the stem 46 will cause a downward motion of the bypass valve member 28 which is less than the downward motion of the stem 46.

When the bypass valve member 28 is floating on the stem 46, that is during approximately the last three quarters of the stroke of the stem, the position of the bypass valve member is governed by the opposing forces of the compression and yield springs 66 and 68. The lower end of the yield spring 68 abuts shoulder 74 while the upper end of the compression spring 66 abuts the stem guide 72 which moves up and down with the stem. Thus it will be observed that the downward motion of the bypass valve member 28 is proportional to and less than the downward motion of the stem 46 and the inlet valve member 26.

The proportional movement of bypass valve member 28 closely follows the changing friction factor and thus assures that the ratio of cold water to overheated water entering the mixing chamber 16 is constant over a wide range of flows. In the preferred embodiment the stiffnesses of the compression and yield springs 66 and 68 are selected to provide a slight increase in the blended hot water temperature with increasing flow rates. However it is to be understood that by changing the stiffnesses of the springs the control valve assembly 10 will provide a constant blended water temperature or one that decreases with increasing flow.

Figure 4:
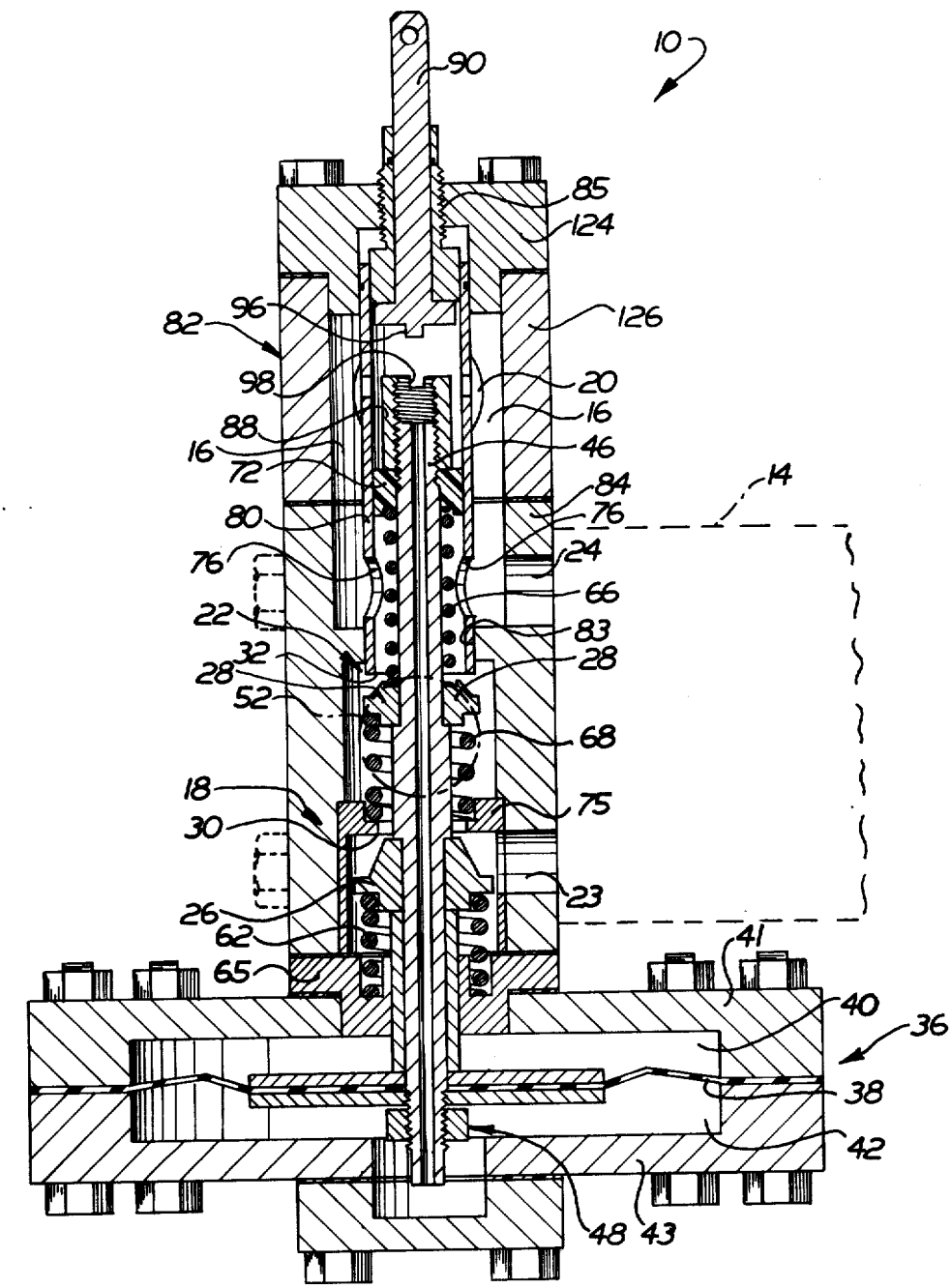
FIG. 4 is a side sectional view of the control valve assembly of FIG. 3 showing both valves opened a small amount in response to a small demand for blended hot water.
Figure 5:
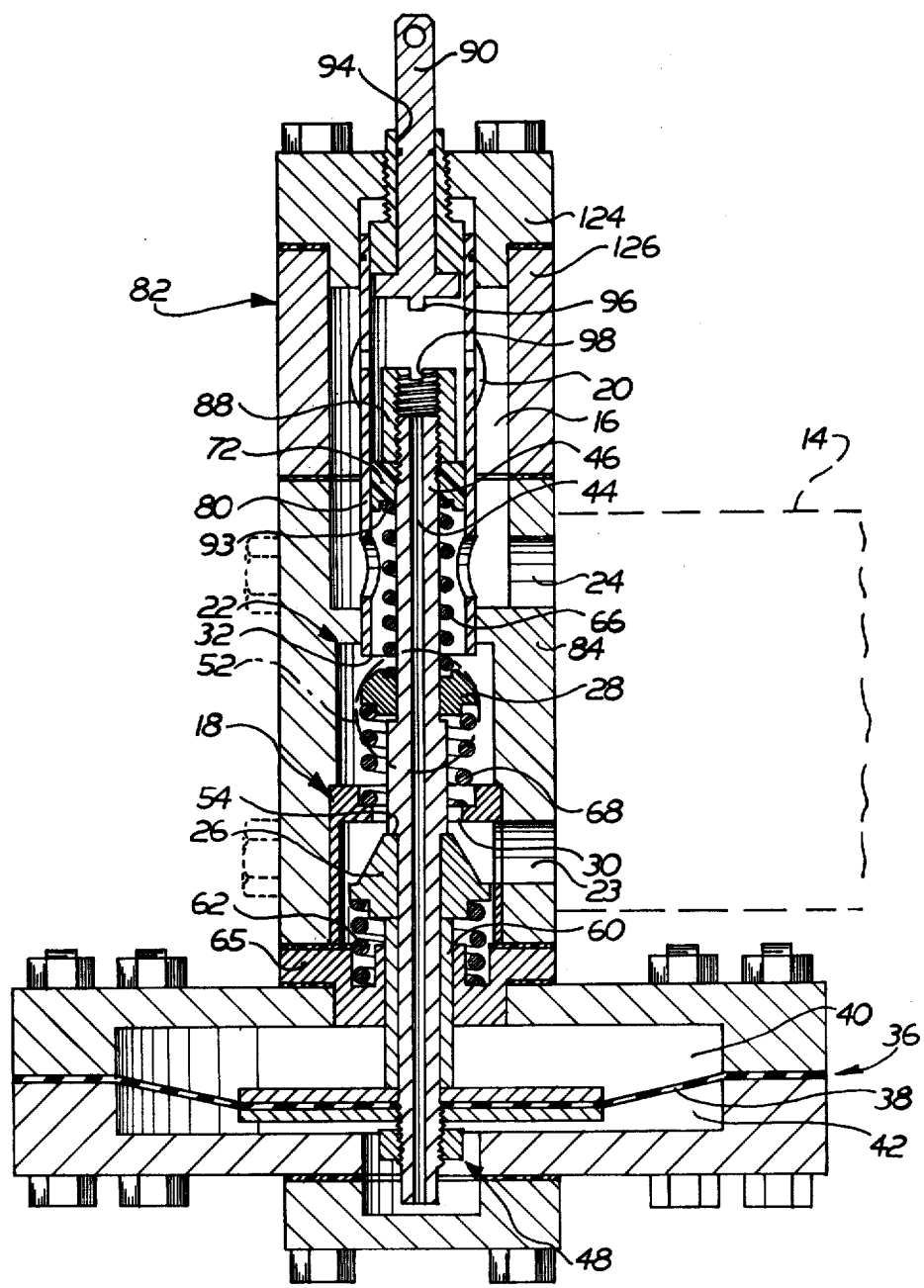
FIG. 5 is a sectional view similar to FIG. 4 but showing both valves opened a large amount in response to an increased demand for blended hot water.

Two adjustments of the control valve assembly 10 may be made to assure that the proportions of overheated hot water entering the blending chamber 16 from the heat exchanger 14 and bypassed cold water entering the blending chamber are nearly constant over a wide range of demand. The first adjustment is made at low flow conditions when demand for blended hot water is small and the flow rate of water through the heat exchanger 14 is small (FIG. 4). The second adjustment is made when demand for blended hot water is large and water is flowing through the hot water tap 15 at at least 50% of the maximum flow (FIG. 5). The ability to adjust the valve openings at two different demand levels to achieve the same blended water temperature assures a nearly constant temperature over the entire range of flow rates.

The first, or low flow, adjustment is made when a small demand for blended hot water has opened the inlet valve 18 and the bypass valve 22 a small amount through the action of the controller 36 (FIG. 4). This adjustment is accomplished by moving the bypass valve seat 32 toward or away from the bypass valve member 28.

The bypass valve seat 32 comprises one annular end of the cylindrical tubular member 80 which surrounds the stem 46. The tubular member 80 is held coaxial with the housing 82 by sliding abutting engagement with a cylindrical surface 83 which projects radially inward from the center member 84 of the housing 82. The tubular member 80 may slide axially and rotate within the center member 84 of the housing 82.

Suitable threads 85 are located on the end portion of the tubular member 80 which is opposite the valve seat 32. By rotating the tubular member 80, the bypass valve seat 32 can be moved toward or away from the bypass valve member 28 to regulate the amount of cold water flowing through the bypass valve 22.

The second adjustment is made when the flow rate is at about 50% of full capacity (FIG. 5). The adjustment is effective to move the bypass valve member 28 relative to the bypass valve seat 32 by changing the load on the yield spring 68 and the compression spring 66. The upper end of the compression spring 66 abuts a teflon upper stem guide 72 which in turn abuts an adjusting nut 88. By turning the adjusting nut 88, the compression and yield springs 66 and 68 may be compressed or allowed to expand to move the bypass valve member 28 on the stem 46.

The stem guide 72 serves to keep the stem 46 coaxial with the tubular member 80. The guide 72 is annular, having a cylindrical outside surface disposed in sliding abutting engagement with the inside of the tubular member 80. An inside cylindrical surface of the stem guide 72 is disposed in sliding abutting engagement with the outside of the stem 46. The bottom surface of the stem guide 72 receives the upper end of the compression spring 66 in a shallow cylindrical recess 93.

Axial adjustment of the adjusting nut 88 causes a proportional movement of the bypass valve member 28 along the stem 46. The adjusting nut 88 is threadably connected to the stem 46. The adjusting nut 88 abuts the top surface of the stem guide 72 and may be moved up or down the stem to adjust the load on the compression spring 66 and yield spring 68. This regulates the flow of cold water through the bypass valve 22.

A tool 90 for rotation of the adjusting nut 88 extends through and sealingly engages the central cylindrical passage 94 in the tubular member 80. The tool includes a pawl 96 at one end to engage a slot 98 in the head of the adjusting nut 88. The tool 90 is rotatable and axially slidable in a cylindrical passage 94 through the tubular member 80. The tool 90 may be disengaged from the nut 88 after adjustment and moved upward to a position where it will not interfere with the up and down motion of the stem 46.

It may be desirable to provide the control valve assembly 10 with an additional adjustment 100 (FIG. 9) to control the blended hot water temperature at the maximum flow rate. When the valve assembly 10 is equipped with such a gain adjustment 100, the compression and yield springs 66 and 68 are selected so that the flow ratio of overheated water to cold water into the mixing chamber 16 decreases slightly with increasing flow. With these springs the water leaving the mixing chamber 16 at maximum flow is at slightly lower temperature than at low flow rates. The gain adjustment 100 is adjustable to provide an increased flow of cold water to the heat exchanger to thereby raise the blending chamber temperature a desired amount.

When the gain adjustment 100 is open, cold water from the cold water inlet 52 flows through passage 50, needle valve 101 and passage 102 into the inlet valve chamber 104.

The needle valve 101 includes an axially adjustable needle 108. A shoulder 120 provides a surface against which the tapering end portion 122 of the needle 108 may seat. Rotation of the needle 108 toward or away from the shoulder 120 regulates the flow of water from the cold water inlet 52 to the inlet valve chamber 104 via passage 50 and passage 102.

The housing 82 for the control valve assembly 10 is composed of four members connected with the controller 36 in stacked coaxial arrangement. The cap 124 is the uppermost member. The cap 124 is adapted to engage the threads 85 on the tubular member 80 to enable axial movement of the tubular member. A concentric smooth walled cylindrical passage 125 sealingly engages an O-ring 83 in the outside surface of the tubular member 80 to prevent water leakage as the tubular member moves.

The outlet section 126 of the housing 82 includes a central cylindrical passage which forms the mixing chamber 16. The upper end of the outlet section 126 sealingly engages the cap 124. The opposite end of the outlet section 126 sealingly engages the center section 84 of the housing 82. The cylindrical blended water outlet 20 intersects the mixing chamber 16 and suitable means are provided to connect the outlet with conduits leading to the tap 15 for blended hot water shown in FIG. 1.

The center member 84 (FIGS. 3 and 4) of the housing 82 includes suitable means for connecting the cold water supply to the cold water inlet 52. The outlet 23 from the inlet valve chamber 104 to the heat exchanger 14 and the inlet 24 for overheated water from the heat exchanger to the blending chamber 16 are sealingly connected with corresponding openings in the heat exchanger.

A shoulder 129 (FIG. 3) on the inside of the center member 84 separates the inlet chamber 130 from the blending chamber 16. A second shoulder 131 on the inside of the center member 84 provides a stop for the inlet valve seat member 75.

The inlet valve seat member 75 is a generally hollow cylinder. The upper end portion of the inlet valve seat member 75 projects radially inward to form the inlet valve seat 30. During assembly the valve seat member 75 is inserted into the center member 84. The inlet valve seat member 75 is held against axial motion by abutting engagement with the shoulder 131 at one end and the lower stem guide 65 at the opposite end.

The cap 124, the outlet member 126, the center member 84 with the inlet valve seat member 75, and the lower stem guide 65 are all connected with the controller 36 in stacked, coaxial relationship to form the housing 82 of the control valve assembly 10.

Figure 6:
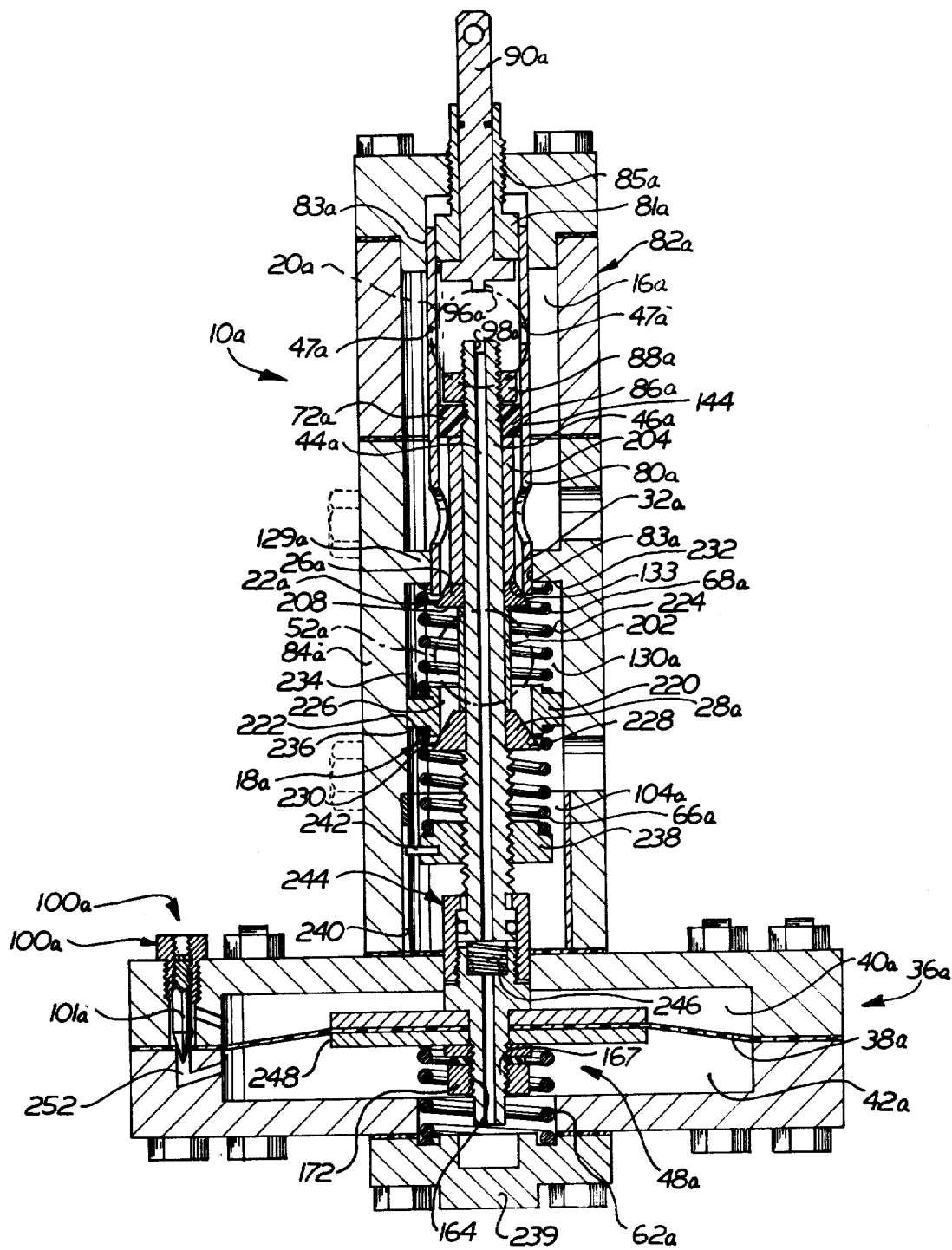
FIG. 6 is a side sectional view through a second preferred embodiment of the present invention showing a bypass valve member and valve seat and an inlet valve member and a floating inlet valve seat.

Another preferred embodiment of the present invention is illustrated in FIG. 6 in which similar numerals have been used to indicate similar parts.

The controller 36a operates in much the same manner as in the previous embodiment. Water pressure from the blended water outlet 20a is conducted through holes 47a in the tubular member 80a and down the central passage 44a in the hollow stem 46a to the lower pressure chamber 42a. Water pressure from the cold water inlet 52a passes to the upper diaphragm chamber 40a through a passage (not shown) substantially the same as the passage 50 shown in FIG. 3.

In this second preferred embodiment both valve members 26a and 28a (FIG. 6) are held in fixed axial positions on the stem 46a. A conical inlet valve member 28a and a conical bypass valve member 26a are coaxial with the stem 46a and held against axial movement in a stacked arrangement by suitable spacer cylinders 202 and 204. The lower spacer cylinder 202 is effective to maintain a fixed distance between the inlet valve member 28a and the bypass valve member 26a. The upper spacer cylinder 204 abuts the top of the bypass valve member 26a and a teflon stem guide 72a. A nut 88a threadably engages the stem 46a and the stem guide 72a and prevents motion of the entire stack relative to the stem.

The range spring 62a urges both the inlet 18a and the bypass 22a valves to a closed position by urging the stem 46a upward as viewed in FIG. 6. A lower pressure on the lower side 42a of the diaphragm 38a than on the upper side 40a causes the diaphragm and the stem 46a to move downward to open the inlet 18a and bypass valves 22a. This downward motion is opposed by the helical range spring 62a which abuts the lower side of the diaphragm retainer 48a and the housing end cap 239.

The inlet valve seat 220 forms a movable barrier between the cold water supply chamber 130a and the inlet valve chamber 104a. The valve seat 220 is annular in shape and its cylindrical outside surface 222 is slidably and sealingly engaged by the central cylindrical passage 224 in the center member 84a of the housing 82a. One end of a cylindrical passage 226 through the inlet valve seat 220 provides a circular surface 228 which sealingly engages a tapering side surface 230 of the inlet valve member 28a when the inlet valve 18a is closed.

The inlet valve seat 220 floats axially in housing 82a between a yield spring 68a and a compression spring 66a. The center member 84a of the housing 82a is provided with an annular surface 232 which projects radially inward from the cylindrical passage 224. The yield spring 68a extends between the annular surface 232 and an upper surface 234 of the inlet valve seat 220. The compression spring 66a extends between an opposite lower, surface 236 of the inlet valve seat 220 and an adjusting nut 238 threadably connected to the stem 46a.

In operation the controller 36a senses the demand for blended hot water and moves the stem 46a accordingly. Downward motion of the stem 46a moves the bypass valve 22a a like amount away from the bypass valve seat 32a. This enables cold water to enter the mixing chamber 16a.

The inlet valve 18a also opens when the stem 46a moves downward. Downward motion of the inlet valve member 28a is accompanied by a proportional downward motion of the inlet valve seat 220. The position of the movable inlet valve seat 220 is controlled by the yield and compression springs 68a and 66a in the same manner as the bypass valve member 28 (FIG. 3) of the first preferred embodiment. When the stem 46a (FIG. 6) moves, the inlet valve seat 220 moves downward a distance that is less than and proportional to the extent of motion of the stem 46a. This enables water to flow through the inlet valve 18a, through the heat exchanger 14 and into the mixing chamber 16a.

The amount of water flowing through the inlet valve 18a is larger than the amount flowing through the bypass valve 22a. This is true despite the fact that in all open positions the distance between the inlet valve member 28a and the inlet valve seat 228 is smaller than the distance between the bypass valve member 26a and the bypass valve seat 32a. The inlet valve seat 228 has a larger diameter than the bypass valve seat 32a. Therefore a given space between the inlet valve member 28a and inlet valve seat 228 produces a larger flow rate through the inlet valve 18a than is possible through the bypass valve 22a with a larger space between the bypass valve member 26a and seat 32a.

As the demand for blended hot water varies, the stem 46a and the inlet valve seat move to regulate the flow of water admitted to the heat exchanger 14 and bypassed around the heat exchanger so that a constant temperature of water leaving the blending chamber 16a may be maintained.

The control valve assembly 10a of the second preferred embodiment is adjustable at two different flow rates to assure a uniform temperature of blended hot water at all levels of demand. The first temperature adjustment is made at low flow and the second at about 50% of maximum flow. The low flow adjustment is substantially the same as the low flow adjustment in the first preferred embodiment. The low flow adjustment is made by rotating the tubular member 80a to move it relative to the bypass valve member 28a. This regulates the temperature of the blended water by controlling the amount of cold water in the mixture.

The second adjustment is made when the valve stem 46a has moved approximately one half of its total stroke in response to demand for blended hot water. To make the adjustment, adjusting nut 238 is moved axially on the stem 46a to change the compressive force exerted on springs 66a an 68a. This moves the valve seat 220 and varies the flow through the inlet valve 18a.

The adjusting nut 238 which supports the lower end of the compression spring 66a threadably engages the stem 46a. A pin 242 extends radially from the the nut 238 into a vertically extending slot 240 in the housing 82a. The pin 242 holds the nut 238 against rotation relative to the housing 84a. The valve stem 46a may be rotated using a tool 90a. When the pawl 96a on the tool 90a engages a slot 98a in the upper end portion of the stem 46a, it is possible to rotate the stem.

Axial motion of the adjusting nut 238 on the stem 46a increases or decreases the compressive force exerted on the yield spring 68a and the compression 66a spring which in turn causes the inlet valve seat 220 to move relative to the inlet valve member 26a. This changes the amount of water admitted to the heat exchanger 14. When the pawl 96a of the tool 90a engages the stem 46a and the tool and stem are rotated, the adjusting nut 238 moves up or down on the stem. Regulating the amount of water entering the heat exchanger 14 regulates the final temperature of the blended hot water.

The rotation of the stem 46a during the second adjustment necessitates some means for enabling the stem to rotate while the diaphragm 38a and diaphragm retainer 48a do not, yet the means must also be able to transmit upward and downward motion of the diaphragm to the stem. Such a swivel-joint is shown generally at 244 and includes a central passage 246 which is in communication with the passage 44a through the stem 46a and with the lower pressure chamber 42a. The swivel-joint 244 is of ordinary design and does not form part of the present invention.

FIG. 6 also shows a second preferred embodiment of a gain controller 100a which regulates the temperature of blended hot water at the maximum flow rate. When the control valve assembly is used with gain controller 100a, the springs 66a and 68a and the slopes of the tapering surface of the inlet valve member 28a selected so that the temperature of the blended hot water increases with increasing flow rates. The gain controller 100a is adapted to supply cold water to the blending chamber 16a to lower the blended water temperature.

The gain controller 100a includes a needle valve 101a which regulats the flow of cold water through a passage 252 between the upper 40a and lower 42a pressure chambers. By opening the valve 101a, cold water flows from the upper pressure chamber 40a to the lower pressure chamber 42a and through the central passage 44a in the stem 46a to the blending chamber 16a. By admitting more or less cold water to the blending chamber 16a, the needle valve 101a controls the temperature of blended hot water.

Figure 7:
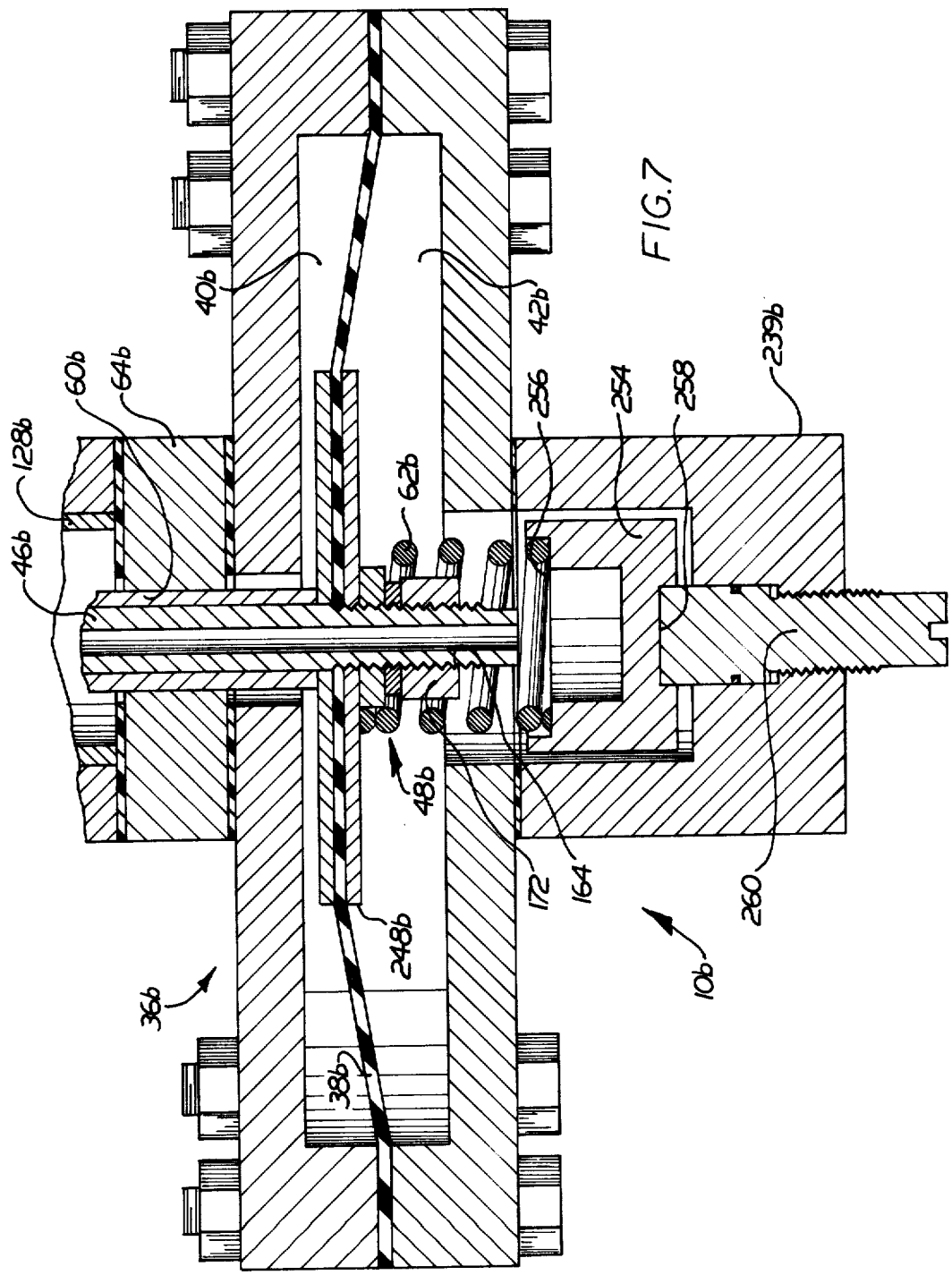
FIG. 7 is a side sectional view of a third embodiment of the control valve assembly illustrated in FIG. 3 differing primarily in the arrangement of springs.

Either embodiment of the invention may also include an adjustment to regulate the preload on the range spring 62b. (See FIG. 7 in which similar numerals have been used to indicate similar parts). If it is desired to provide such an adjustment, the range spring 62b is located in the lower diaphragm pressure chamber 42b. The range spring 62b presses between a lower flat washer 248b which is part of the diaphragm retainer 48b and an axially adjustable spring support 254. The spring support 254 has an annular upper surface 256 which abuts the lower end of the range spring 62b. The lower surface 258 of the spring support 254 abuts a bolt 260 which extends through an end cap 239b. Rotation of the bolt 260 causes the spring support 254 to move up or down to change the preload on the spring 62b.

Figure 8:
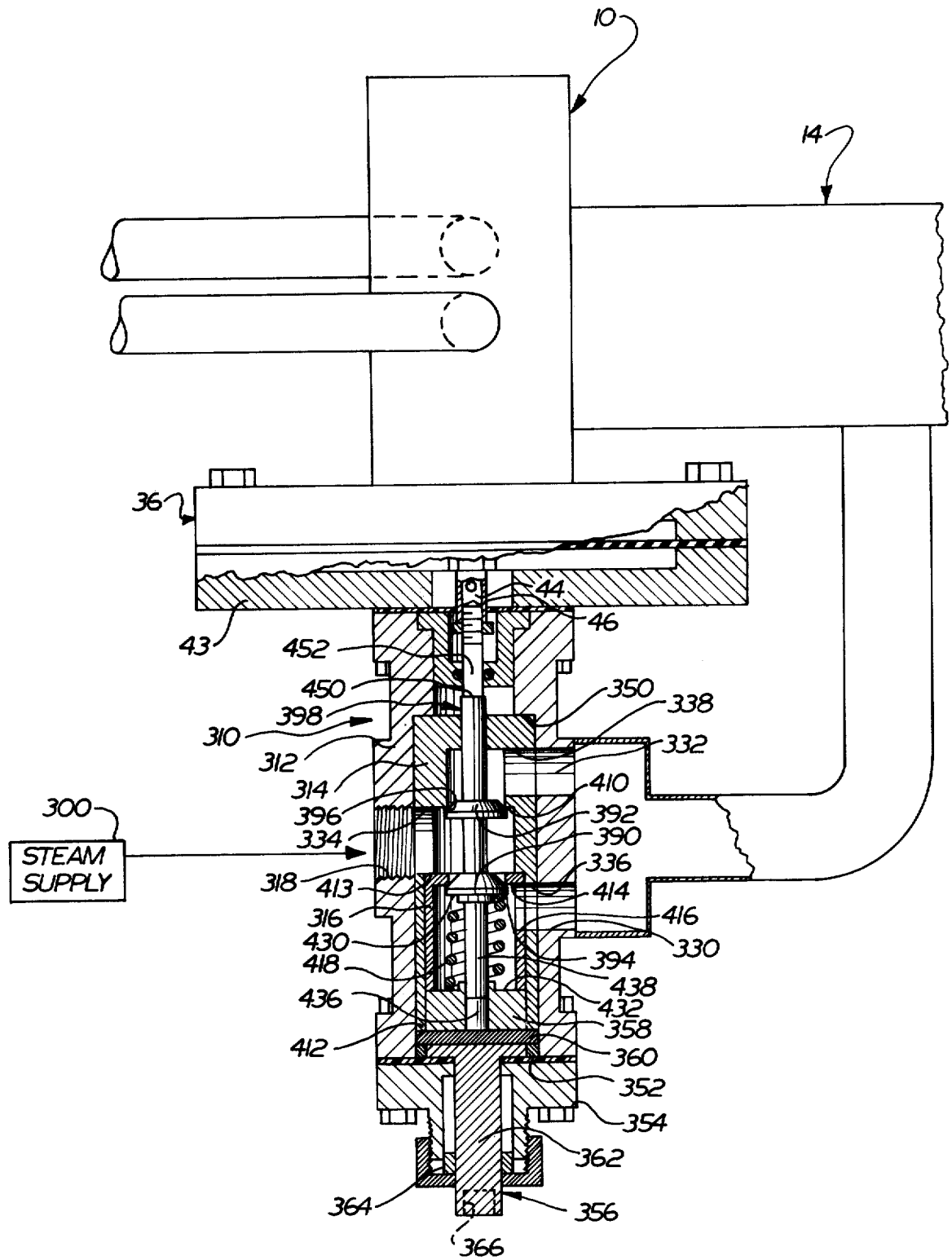
FIG. 8 is a partly sectional view of a fourth preferred embodiment of the present invention showing a steam control valve.

It may be desirable to provide the control valve assembly 10 with the capability of being connected with a high pressure steam supply 300 (FIG. 8). This may be accomplished by utilizing the steam control valve 310 in connection with control valve assembly 10.

The steam control valve 310 is operatively linked to the controller 36. Steam is admitted to the heat exchanger 14 through the steam control valve 310 when the controller 36 moves the stem 46 downward in response to initiation of demand for blended hot water.

The steam control valve 310 includes three concentric sleeves 312, 314, 316. The outermost sleeve 312 forms the body of the steam control valve 310 and is connected with the lower body member 43 of the control valve assembly 10. A steam supply 300 is connected at an inlet 318 in the outer sleeve 312. When the steam control valve 310 is open, steam passes through the valve and out the steam outlets 330 and 332 in the outer sleeve 312.

The rotatable middle sleeve 314 cooperates with the outer sleeve 312 to form a manually operable valve. The rotatable sleeve 314 has a cylindrical outside surface in sliding abutting engagement with an inside cylindrical surface of the outer sleeve 312. The rotatable sleeve 314 includes an inlet passage 334 and a pair of outlet passages 336 and 338. The rotatable sleeve 314 may be rotated to a position where the inlet passage 334 in the rotatable sleeve 314 is in alignment with the inlet 318 in the outer sleeve 312. When the rotatable sleeve 314 is in this position, the outlet passages 336 and 338 are aligned with the outlets 330 and 332 respectively.

The rotatable sleeve 314 is held against axial motion in one direction with respect to the outer sleeve 312 by a surface 350 which projects radially inward on the inside of the outer sleeve. Axial motion in the opposite direction is prevented by abutting engagement of the end 352 with the rotatable sleeve 314 and the end cap 354.

The rotatable sleeve 314 may be rotated to select the maximum steam flow through the steam control valve 310. An axially extending member 356 is adapted to transmit rotary motion from a tool (not shown) to the sleeve 314. Rotation of the rotatable sleeve 314 increases or decreases the extent of overlap or alignment of the inlet 318 and outlets 330 and 332 in the outer sleeve 312 with the inlet passage 334 and the outlet passages 336 and 338 in the rotatable sleeve.

The member 356 has two concentric end portions. The upper end portion 358 is permanently connected with the rotatable sleeve 314 by a transverse pin 360. The lower end portion 362 has a cylindrical outside surface which is sealingly contacted by a seal 364. A socket 366 in the lower end portion 362 is adapted to receive a tool (not shown) to rotate the member 356 and the sleeve 314.

During set up and installation of the control valve assembly 10 and the steam control valve 310, hot water taps are opened to create a large demand for blended hot water. The rotatable sleeve 314 is then rotated from a closed position to a partially open position to admit steam to the heat exchanger 14. The temperature of the blended hot water is then measured, and if it is below the desired temperature, the rotatable sleeve 314 is rotated to a more open position. In this way the rotatable sleeve may be adjusted to regulate the maximum blended water temperature.

The rotatable sleeve 314 acts as a pressure control valve for the steam flowing through the heat exchanger 14. For any given flow rate of water through the control valve assembly 10 and the heat exchanger 14, the rate of steam condensation within the heat exchanger is constant. This means that the condensation process is isothermal and also isobaric. Thus by adjusting the rotatable sleeve 314 to select the maximum desired water temperature, the maximum pressure in the heat exchanger 14 may also be selected.

The steam control valve 310 includes lower and upper frustro-conical valve members 390 and 392 which cooperate with a pair of circular valve seats 394 and 396. The valve members are fixedly connected with a valve stem 398. The valve members 390 and 392 are coaxial and spaced apart so that when the valve stem 398 moves to its uppermost position both valves are seated against their respective valve seats 394 and 396.

However, the valve members 390 and 392 may be spaced on the valve stem 398 so that when one valve is closed a small amount of steam is permitted to flow through the other valve to the exchanger 14. This prevents steam pressure from blocking downward motion of the controller 36.

The upper valve seat 396 is formed at the edge of an annular surface 410 which projects radially inward from the inner surface of the rotatable sleeve 314. When the upper valve member 392 is moved away from its seat 396, steam is enabled to flow through the inlet 318 and the inlet passage 334, through the valve seat 396 and out the outlet passage 338 and the outlet 332.

Figure 9:
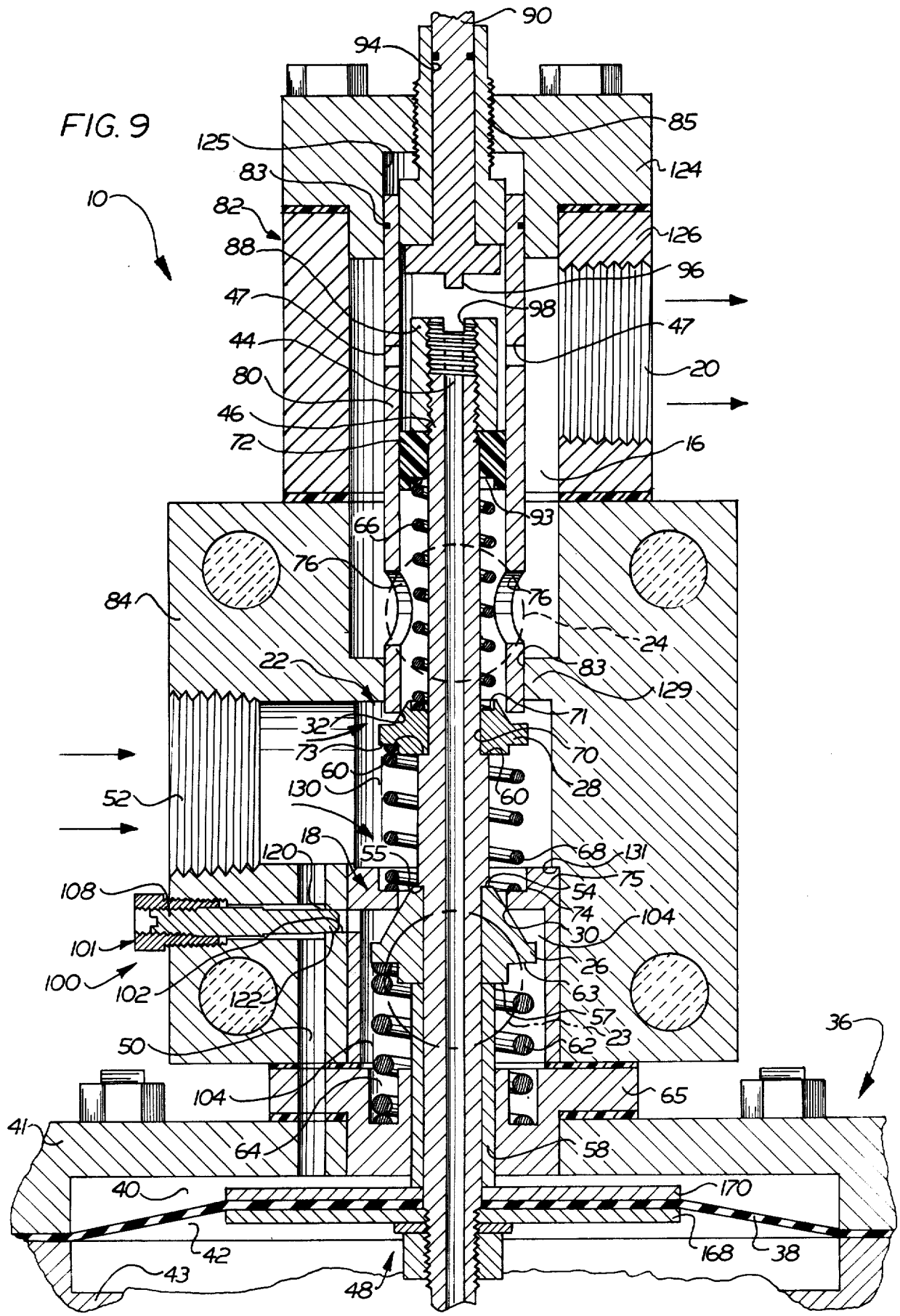
FIG. 9 is an enlarged sectional view generally similar to FIG. 3 but showing a control valve assembly having a gain adjustment.

The inside sleeve 316 has an outside diameter the same as the inside diameter of the lower portion 412 of the rotatable sleeve 314. A radially inwardly projecting shoulder 413 located just below the inlet passage 334 (as shown in FIG. 9) abuts the inside sleeve 316. The inside sleeve 316 is pressed into the rotatable sleeve 314, and once in place does not move independently of the rotatable sleeve.

The lower valve seat 394 is formed at the edge of an annular surface 414 which projects radially inward from the inside sleeve 316. When the lower valve member 390 has been moved away from its seat 394, steam is enabled to flow through the inlet 318 and inlet passage 334 through the lower valve seat 394, through an opening 416 in the inside sleeve 316 and through the outlet passage 336 and the outlet 330.

A bias spring 418 urges the valve stem 398 upward and the valve members 390 and 392 toward a closed position. The bias spring 418 replaces the range spring 62 used in other embodiments (FIG. 3). One end of the bias spring 418 presses against the lower end surface 430 of the lower valve member 390 (FIG. 9). The other end of the bias spring 418 abuts the top 432 of member 356.

A cylindrical recess 436 in member 358 receives the lower end portion 438 of the valve stem 398 and assures that it is maintained concentric with the valve seats 394 and 396.

An adjustment is provided to coordinate the action of the controller 36 with the steam control valve 310. The upper end 450 of the valve stem 398 abuts a shaft 452 which is threadably received in the central passage 44 of the stem 46 of the control valve assembly 10. The shaft 452 is coaxial with the stem 46 and rotation of the shaft is effective to increase or decrease the distance between the lower end of the stem 46 and the upper end of the valve stem 398.

In operation, the diaphragm controller 36 senses demand for blended hot water and actuates the stem 46 downward an amount proportional to the demand. Downward motion of the stem 46 is transmitted through shaft 452 to the steam valve stem 398 which moves downward and enables steam to flow through the steam control valve 310 into the heat exchanger 14. The movement of the valve stem 398 thus follows the demand for blended hot water, increasing the amount of steam admitted to the heat exchanger in response to increases in demand.

As previously noted, the rotatable sleeve 314 regulates the maximum flow of steam through the steam control valve 310. This means that the rotatable sleeve also regulates the pressure drop between the inlet 318 and the outlets 330 and 332 to the steam control valve 310.

The action of the stem 398 and the valve members 390 and 392 further regulates the steam flow rate through, and the pressure drop across, the steam control valve 310. The pressure drop across the steam control valve 310 is maximum when the valve stem 398 is in its uppermost position and valves 390 and 392 are in sealing engagement with seats 394 and 396 respectively. As the valve stem 398 moves downward in response to increasing demand, the pressure drop across the steam control valve 310 decreases until it reaches the lower limit established by the rotatable sleeve 314.

Thus it is clear that the present invention provides a new and improved control valve assembly 10 for use in a blending hot water heater (FIG. 2). The flow of cold water into the valve assembly 10 is split, a portion of it flowing through an inlet valve 18 into a heat exchanger 14, and a portion of it flowing through a bypass valve 22 into a mixing chamber 16. Overheated water from the heat exchanger flows into the mixing chamber 16. The relative flow of rates cold water and overheated water into the blending chamber 16 are regulated by diaphragm actuated inlet and bypass valves 18 and 22.

Both the inlet and bypass valves 18 and 22 are poppet-type valves which inherently require little maintenance. Because no tight fitting machined surfaces slide on one another, there is little tendency for corrosion to be a problem. Further, the overheated water from the exchanger 14 never flows through a flow regulating orifice, and consequently the dangerous tendency for the flow of hot water to choke itself off and raise the heat exchanger pressure is not present.

The ratio of the flow of water bypassed around the heat exchanger 14 to the flow through the heat exchanger is controlled by a controller 36 including a diaphragm 38 which actuates a valve stem 46 (FIGS. 2 and 3). A pressure drop caused by an increase in demand is sensed by the diaphragm 38. The valve stem 46 moves an amount which corresponds to the size of the demand increase and opens one of the poppet valves 18 and 22 a like amount. The other valve also opens when the valve stem 46 moves, but the extent of opening is adjusted to compensate for changes in the pressure drop across the heat exchanger 14 and in the temperature of the water leaving the heat exchanger, both caused by the changing flow rate.

Two adjustments are provided to assure that the blended water temperature is very nearly constant over a wide range of demand. A first temperature adjustment is made when the demand for blended hot water is small (FIG. 5). The amount of cold water admitted through the bypass valve 22 into the blending chamber 16 is adjusted by moving a bypass valve seat 32 toward or away from the bypass valve member 28 until the desired blended hot water temperature is achieved.

The second adjustment is made when the flow is about 50% of capacity (FIG. 6). In one preferred embodiment a pair of opposing springs 66 and 68 supports the bypass valve member 28. The extent of compression of the springs 66 and 68 is changed to cause the valve member 28 to move toward or away from the bypass valve seat 32 and thus to regulate the amount of cold water admitted to the blending chamber 16 at 50% flow.

In addtion the present invention includes a steam control valve 310 (FIG. 8) operatively connected with the controller 36 to regulate the flow of steam through the heat exchanger 14. The steam control valve 310 includes a variable orifice which is manually adjustable to select the maximum flow rate of steam through the heat exchanger 14. The steam control valve also includes poppet valves 390 and 392 which vary the flow of steam in response to variations in demand between no steam flow at no demand conditions and the maximum steam flow established by the manually adjustable orifice at maximum demand conditions.

What is claimed is:

1. A control valve assembly comprising housing means for receiving an incoming flow of cold water from a cold water source and defining first and second cold water flow paths, first valve means for regulating a flow of cold water in said first flow path to a heat exchanger, mixing chamber means for receiving the flow of hot water from the heat exchanger and a flow of cold water from said second flow path, second valve means for regulating the flow of cold water in said second flow path, said mixing chamber means having an outlet for mixed hot and cold water, and controller means responsive to changes in the demand for mixed water for varying the rate at which cold water flows in said first and second flow paths as a predetermined function of the flow rate of mixed water through said outlet from said mixing chamber means.

2. A control valve assembly as set forth in claim 1 wherein said controller means includes first and second diaphragm chambers, a cylindrical valve stem connected with said first and second valve means, first surface means defining a passage interconnecting the source of cold water and said first diaphragm chamber, said valve stem having second surface means defining a central cylindrical passage interconnecting said mixing chamber means and said second diaphragm chamber, and diaphragm means separating said first and second diaphragm chambers for moving said valve stem in response to differences between the water pressure at the source of cold water and the water pressure in said mixing chamber means.

3. A control valve assembly as set forth in claim 1 wherein said first valve means includes a first valve member and a first valve seat, said second valve means including a second valve member and a second valve seat, said controller means including an axially movable stem and diaphragm means connected with said stem for moving said stem in one axial direction in response to increasing demand for mixed hot and cold water from said outlet of said mixing chamber and in the opposite direction in response to decreasing demand, said first valve member being fixedly connected with said stem for axial motion together therewith, said second valve member being slidably supported for axial motion relative to said stem, and opposed first and second spring means for controlling the axial motion of said second valve member on said stem, said first spring means urging said second valve member toward sealing engagement with said second valve seat with a force which decreases as said second valve member approaches said second valve seat, said second spring means urging said second valve member away from sealing engagement with said second valve seat with a force which decreases as said second valve member moves away from said second valve seat and which increases as said stem moves in the direction corresponding to increasing demand for blended hot water.

4. A control valve assembly as set forth in claim 3 wherein said controller means further includes third spring means for urging said first valve member into sealing engagement with said first valve seat, said first, second and third spring means cooperating to position said first and second valve members relative to said first and second valve seats to regulate the flow rates of water through said first and second flow paths as a function of the flow rate through said outlet, said first, second and third spring means having stiffnesses to cause the ratio of the flow rate of water through said first flow path to the flow rate of water through said second flow path to increase with increasing flow rates through said outlet from said mixing chamber.

5. A control valve assembly as set forth in claim 4 wherein said first valve member includes a first upstream surface area, the pressure of the water upstream of said first valve means acting on said first upstream surface area to urge said first valve member away from engagement with said first valve seat and to urge said stem in the direction corresponding to an increase in demand for blended hot water, said second valve member having a second upstream surface area, the pressure of the water upstream of said second valve means acting on said second upstream surface area to urge said second valve member toward engagement with said second valve seat and to urge said stem in the direction corresponding to a decrease in demand for blended hot water, said first upstream surface area and said second upstream surface area bearing a predetermined ratio to each other whereby when said stem is in a position corresponding to no demand for blended hot water and said first valve member is disposed in sealing engagement with said first valve seat said stem is free of any net axial force exerted by upstream water pressure on said first and second upstream surface areas.

6. A control valve assembly as set forth in claim 3 wherein said controller means further includes third spring means for urging said first valve member into sealing engagement with said first valve seat, said first, second, and third spring means cooperating to position said first and second valve members relative to said first and second valve seats to regulate the flow rates of water through said first and second flow paths as a function of the flow rate through said outlet, said first, second and third spring means having stiffnesses to cause the ratio of the flow rates of water through said first and second flow paths to remain constant despite changes in the flow rate of mixed water through said outlet from said mixing chamber.

7. A control valve assembly as set forth in claim 3 wherein said controller means further includes third spring means for urging said first valve member into sealing engagement with said first valve seat, said first, second, and third spring means cooperating to position said first and second valve members relative to said first and second valve seats to regulate the flow rates of water through said first and second flow paths as a function of the flow rate through said outlet, said first, second and third spring means having stiffnesses to cause the ratio of the flow rate of water through said first flow path to the flow rate of water through said second flow path to decrease with increasing flow rates through said outlet from said mixing chamber.

8. A control valve assembly as set forth in claim 4 wherein said stem includes surface means for engaging said second valve member and for urging said second valve member toward said second valve seat against the influence of said second spring means, said stem being movable in response to variations in demand between a first position when the demand for mixed water is small in which said surface means is disposed in abutting engagement with said second valve member and a second position when the demand for mixed water is large in which said surface means is free of abutting engagement with said second valve member.

9. A control valve assembly as set forth in claim 3 further including low flow adjustment means for adjustably selecting the temperature of the water leaving said mixing chamber means when demand for mixed hot and cold water is small, said low flow adjustment means including means for moving said second valve seat relative to said second valve member and said valve stem to thereby regulate the rate of flow of cold water through said second valve means.

10. A control valve assembly as set forth in claim 9 wherein said second valve seat comprises one annular end of a tubular member and said means for moving said second valve seat relative to said second valve member includes threads on said tubular member and cooperating threads on said housing means.

11. A control valve assembly as set forth in claim 3 further including high flow adjustment means for adjustably selecting the temperature of the water leaving said mixing chamber means when demand for mixed hot and cold water is large, said high flow adjustment means including spring adjustment means for moving said second valve member relative to said second valve seat and relative to said valve stem by changing the tension in said first and second spring means to thereby regulate the flow of cold water through said second valve means.

12. A control valve assembly as set forth in claim 11 wherein said spring adjustment means includes a stop member engaged by said stem for motion together therewith, said stop member having surface means supporting one end of said second spring means, said stop member and said stem having cooperating threads, and means for causing said stop member to rotate relative to said stem to thereby effect axial motion of said surface means and to change the tension in said spring means.

13. A control valve assembly as set forth in claim 3 further including low flow adjustment means for adjustably selecting the temperature of the water leaving said mixing chamber means when demand for mixed hot and cold water is small, said low flow adjustment means including means for moving said second valve seat relative to said second valve member and said valve stem to thereby regulate the rate of flow of cold water through said second valve means, and high flow adjustment means for adjustably selecting the temperature of the water leaving said mixing chamber when demand for mixed hot and cold water is large, said high flow adjustment means including spring adjustment means for moving said second valve member relative to said second valve seat and relative to said valve stem by changing the compressive force in said first and second spring means to thereby regulate the flow of cold water through said second valve means.

14. A control valve assembly as set forth in claim 3 wherein said first valve seat and said second valve seat are characterized by having the same flow area through each when said first valve member and said second valve member are displaced an equal distance from said first and second valve seats respectively.

15. A control valve assembly as set forth in claim 1 wherein said controller is free of valve means for regulating a flow of hot water by passing hot water through a variable size orifice.

16. A control valve assembly as set forth in claim 1 further including a steam control valve including manually adjustable valve means for regulating the maximum steam flow area through said steam control valve and controller actuated valve means for regulating the steam flow area through said steam control valve between a minimum flow area and a maximum flow area determined by said manually adjustable valve.

17. A control valve assembly as set forth in claim 1 wherein said controller means is effective to decrease the ratio of cold water flowing in said first flow path to cold water flowing in said second flow path as the flow rate of mixed hot and cold water through said outlet from said mixing chamber means increases, and further including surface means for defining a third cold water flow path between the cold water source and the heat exchanger and third valve means for providing a flow of cold water in said third flow path at a rate which maintains the temperature of mixed water leaving said mixing chamber means constant at all flow rates.

18. A control valve assembly as set forth in claim 1 wherein said controller means is effective to increase the ratio of hot water flowing to said mixing chamber means to cold water flowing to said mixing chamber means as the flow rate of blended hot water through said outlet increases, and further including surface means for defining a third cold water flow path between the cold water source and said mixing chamber means and third valve means for providing a flow of cold water in said third flow path at a rate which maintains the temperature of mixed water leaving said mixing chamber means constant at all flow rates.

19. A control valve assembly as set forth in claim 1 wherein said first valve means includes a first valve member and a first valve seat, said second valve means including a second valve member and a second valve seat, said controller means including an axially movable stem and diaphragm means connected with said stem for moving said stem in one axial direction in response to increasing demand for mixed hot and cold water from said outlet of said mixing chamber and in the opposite direction in response to decreases in demand, said valve members being spaced apart and fixedly connected with said stem for movement therewith, said first valve seat being slidably supported for axial movement toward or away from said first valve member, said controller means further including first and second spring means for controlling the axial motion of said first valve seat relative to said first valve member, said first spring means urging said first valve seat toward sealing engagement with said first valve member with a force that decreases as said first valve seat approaches said first valve member, and said second spring means urging said first valve seat away from said first valve member with a force that decreases as said first valve seat moves away from said first valve member and that decreases as said stem moves in the direction corresponding to increasing demand for blended hot water.

20. A control valve assembly as set forth in claim 19 wherein said first valve means has a larger flow area than said second valve means when said first valve member and said second valve member are axially displaced an equal amount from said first and second valve seats respectively.

21. A control valve assembly as set forth in claim 19 wherein said controller means includes third spring means for urging said first and second valve members toward said first and second valve seats, respectively.

22. A control valve assembly as set forth in claim 19 further including low flow adjustment means for adjustably selecting the temperature of the water leaving said mixing chamber means when demand for mixed hot and cold water is small, said low flow adjustment means including means for moving said second valve seat relative to said second valve member and said valve stem to thereby regulate the rate of flow of cold water through said second valve means.

23. A control valve assembly as set forth in claim 19 further including high flow adjustment means for adjustably selecting the temperature of the water leaving said mixing chamber means when demand for blended hot water is large, said high flow adjustment means including spring adjustment means for moving said first valve seat relative to said first valve member and relative to said stem by changing the compressive force in said first and second spring means to thereby regulate the flow of cold water through said first valve means.

24. A control valve assembly as set forth in claim 19 further including low flow adjustment means for adjustably selecting the temperature of the water leaving said mixing chamber means when demand for mixed hot and cold water is small, said low flow adjustment means including means for moving said second valve seat relative to said second valve member and said valve stem to thereby regulate the rate of flow of cold water through said second valve means, and high flow adjustment means for adjustably selecting the temperature of the water leaving said mixing chamber means when demand for blended hot water is large, said high flow adjustment means including spring adjustment means for moving said first valve seat relative to said first valve member and relative to said stem by changing the compressive force in said first and second spring means to thereby regulate the flow of cold water through said first valve means.

25. A control valve assembly as set forth in claim 1 wherein said first valve means includes a first valve member and a first valve seat, said second valve means including a second valve member and a second valve seat, said controller means including an axially movable stem and diaphragm means connected with said stem for moving said stem in one axial direction in response to increasing demand for mixed hot and cold water from said outlet of said mixing chamber and in the opposite direction in response to decreasing demand, said controller means being effective to decrease the ratio of cold water flowing in said first flow path to cold water flowing in said second flow path as the flow rate of mixed hot and cold water through said outlet from said mixing chamber means increases, and including surface means for defining a third cold water flow path between the cold water source and the heat exchanger and third valve means for providing a flow of cold water in said third flow path at a rate which maintains the temperature of mixed water leaving said mixing chamber means constant at all flow rates, said first valve member being fixedly connected with said stem for axial motion together therewith, said second valve member being slidably supported for axial motion relative to said stem, and opposed first and second spring means for controlling the axial motion of said second valve member on said stem, said first spring means urging said second valve member toward sealing engagement with said second valve seat with a force which decreases as said second valve member approaches said second valve seat, said second spring means urging said second valve member away from sealing engagement with said second valve seat with a force which decreases as said second valve member moves away from said second valve seat and which increases as said stem moves in the direction corresponding to increasing demand for blended hot water, third spring means for urging said first valve member into sealing engagement with said first valve seat, low flow adjustment means for adjustably selecting the temperature of the water leaving said mixing chamber means when demand for mixed hot and cold water is small, said low flow adjustment means including means for moving said second valve seat relative to said second valve member and said valve stem to thereby regulate the rate of flow of cold water through said second valve means, said second valve seat comprising one annular end of a tubular member and said means for moving said second valve seat relative to said second valve member including threads on said tubular member and cooperating threads on said housing means, and a high flow adjustment means for adjustably selecting the temperature of the water leaving said mixing chamber means when demand for mixed hot and cold water is large, said high flow adjustment means including spring adjustment means for moving said second valve member relative to said second valve seat and relative to said valve stem by changing the compressive force in said first and second spring means to thereby regulate the flow of cold water through said second valve means, said spring adjustment means including a stop member having threads and being engaged by cooperating threads on said stem for motion together therewith, said stop member and said stem having cooperating threads, and means for causing said stop member to rotate relative to said stem to thereby cause axial motion of said surface means and to change the compressive force in said spring means, said first valve seat and said second valve seat being characterized by having the same flow area through each when said first valve member and said second valve member are displaced on equal distance from said first and second valve seats respectively.

26. A control valve assembly as set forth in claim 1 wherein said first valve means includes a first valve member and a first valve seat, said second valve means including a second valve member and a second valve seat, said controller means including an axially movable stem and diaphragm means connected with said stem for moving said stem in one axial direction in response to increasing demand for mixed hot and cold water from said outlet of said mixing chamber and in the opposite direction in response to decreases in demand, said controller means being effective to increase the ratio of hot water flowing to said mixing chamber means to cold water flowing to said mixing chamber means as the flow rate of blended hot water through said outlet increases, and further including surface means for defining a third cold water flow path between the cold water source and mixing chamber means and third valve means for providing a flow of cold water in said third flow path at a rate which maintains the temperature of mixed water leaving said mixing chamber means constant at all flow rates, said valve members being spaced apert and fixedly connected with said stem for movement therewith, said first valve seat being slidably supported for axial movement toward or away from said first valve member, said controller means further including first and second spring means for controlling the axial motion of said first valve seat relative to said first valve member, said first spring means urging said first valve seat toward sealing engagement with said first valve member with a force that decreases as said first valve seat approaches said first valve member, and said second spring means urging said first valve seat away from said first valve member with a force that decreases as said first valve seat moves away from said first valve member and that decreases as said stem moves in the direction corresponding to increasing demand for blended hot water, said first valve means having a larger flow area than said second valve means when said first valve member and said second valve member are axially displaced an equal amount from said first and second valve seats respectively, said controller means including third spring means for urging said first and second valve members toward said first and second valve seats, respectively, a low flow adjustment means for adjustably selecting the temperature of the water leaving said mixing chamber means when demand for mixed hot and cold water is small, said low flow adjustment means including means for moving said second valve seat relative to said second valve member and said valve stem to thereby regulate the rate of flow of cold water through said second valve means, a high flow adjustment means for adjustably selecting the temperature of the water leaving the mixing chamber means when demand for blended hot water is large, said high flow adjustment means including spring adjustment means for moving said first valve seat relative to said first valve member and relative to said stem by changing the compressive force in said first and second spring means to thereby requlate the flow of cold water through said first valve means.

* * * * *

UNITED STATES PATENT AND TRADEMARK OFFICE
CERTIFICATE OF CORRECTION

PATENT NO. : 4,219,044
DATED : August 26, 1980
INVENTOR(S) : Warren M. Wilson

It is certified that error appears in the above-identified patent and that said Letters Patent are hereby corrected as shown below:

References Cited

U.S. PATENT DOCUMENTS 3,047,274

3,183,966

3,232,336

OTHER REFERENCES

Sales Brochure - Graham Manufacturing Company, Inc. Greatneck Road, Greatneck, New York, 11021

Column 22, line 53, change "on" to --an--.
Column 23, line 7, change "apert" to --apart--.

Signed and Sealed this

Twentieth Day of January 1981

[SEAL]

Attest:

RENE D. TEGTMEYER

*Attesting Officer*   *Acting Commissioner of Patents and Trademarks*